(12) United States Patent
Ostrovsky et al.

(10) Patent No.: US 6,226,640 B1
(45) Date of Patent: May 1, 2001

(54) METHOD FOR DETERMINING APPROXIMATE HAMMING DISTANCE AND APPROXIMATE NEAREST NEIGHBORS OF A QUERY

(75) Inventors: Rafail Ostrovsky, Secaucus, NJ (US); Yuval Rabani, Haifa (IL)

(73) Assignee: Telecordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/193,207

(22) Filed: Nov. 17, 1998

Related U.S. Application Data
(60) Provisional application No. 60/066,936, filed on Nov. 17, 1997.

(51) Int. Cl.[7] .................................................. G06F 17/30
(52) U.S. Cl. ...................................................... 707/5
(58) Field of Search ........................................ 707/5, 1–4

(56) References Cited

U.S. PATENT DOCUMENTS

| | | | |
|---|---|---|---|
| 4,053,871 | * 10/1977 | Vidalin et al. | 340/4 |
| 4,084,260 | * 4/1978 | Fleming et al. | 707/3 |
| 5,855,018 | * 12/1998 | Chor et al. | 707/9 |
| 5,870,754 | * 2/1999 | Dimitrova et al. | 707/104 |
| 5,890,151 | * 3/1999 | Agrawal et al. | 707/5 |

OTHER PUBLICATIONS

Balakirsky, V. B. "Hashing of Databases Based on Indirect Observation of Hamming Distances," Information Theory, IEEE Transactions on, Mar. 1996, vol. 42, Iss. 2, pp. 664–671.*

Ouyang, Y. C. et al. "Neural Network Based Retrieval Issue on Protoype Database Systems,"Oct. 1991 vol. 3, lines 1493–1497.*

J. Kleinberg, "Two Algorithms for Nearest–Neighbor Search in High Dimensions", Proceedings of the 29th Symposium of Theory of Computing, pp. 599–608, 1997.

P. Indyk and R. Motwani, "Approximate Nearest Neighbors: Towards Removing the Curse of Dimensionality", Proceedings of 30th Symposium of Theory of Computing, pp. 604–613, 1998.

* cited by examiner

*Primary Examiner*—Jack Choules
(74) *Attorney, Agent, or Firm*—Joseph Giordano

(57) ABSTRACT

A method and system identify in a database one or more data entries that are the nearest neighbors of a query. The database prebuilds a first set of strings by probabilistically selecting values of respective bits in each of the first set of strings based on a probability that depends on a first hamming distance. Based on the first set of strings, the database predetermines the trace values of each data entry in the database, respectively, and stores the predetermined trace values as entries in a trace table. For each trace value entry, the database identifies the data entries whose trace values are within a second hamming distance of the trace value entry, and stores the addresses of the identified data entries in the trace value entry. When the database receives a query, by identifying the trace value entry in the trace table that match the trace value of the query, the database identifies the data entries that are within the first hamming distance of the query. In addition, a method and system estimate the hamming distance between two strings in a network.

17 Claims, 7 Drawing Sheets

METHOD FOR DETERMINING APPROXIMATE HAMMING DISTANCE AND APPROXIMATE NEAREST NEIGHBORS OF A QUERY

CROSS-REFERENCE TO RELATED APPLICATIONS

This application claims the benefit of U.S. Provisional Application Ser. No. 60/066,936, filed Nov. 17, 1997, the contents of which are hereby incorporated by reference.

BACKGROUND OF THE INVENTION

The present invention relates generally to information retrieval from electronic storage devices, and more particularly, to a method and system for determining approximate hamming distance of two strings and approximate nearest neighbors of a query.

Comparing files or documents that reside remotely in different inquiring processors in a network is a task, which requires significant communication between the inquiring processors. For example, when a first inquiring processor wishes to compare a first file that resides in the first inquiring processor with a second file that resides in a remote second inquiring processor, the first and second inquiring processors must communicate the files or information about the files over the network.

The least sophisticated method for determining whether the two files match each other is to transmit one of the files over the network and to compare the files at one of the inquiring processors. Communicating an entire file, of course, is not efficient since the size of the file may be large.

A more efficient method for comparing the two files is to communicate, for example, the hash value of one of the files over the network and to compare the respective hash values of the files at one of the inquiring processors. This method, however, only checks for an exact match between the two files.

Hence, it is desirable to estimate at an inquiring processor how closely two files match each other. A hamming distance is one measure of how closely two files or strings match each other. For example, given two strings that are of equal length and include a sequence of bits, the hamming distance of the two strings represents the number of non-matching bits in the two strings.

Similarly, in electronic storage applications, an entry in an electronic storage device is a nearest neighbor of a query when the content of that entry is the closest match from among other entries in the storage device. For example, if the query and the entries in the storage device each include a sequence of d bits, a nearest neighbor entry in the storage device is an entry that has the least number of non-matching bits when compared with the query.

Searching for entries that are the nearest neighbors of a query is a task, which is performed in a variety of applications, including information retrieval, data mining, web search engines and other web related applications, pattern recognition, machine learning, computer vision, data compression, and statistical analysis. Many of these applications represent the entries in an electronic storage device as vectors in a high dimensional space. For example, one known method for textual information retrieval uses a latent semantic indexing, where the semantic contents of the entries and queries are represented as vectors in a high dimensional space.

The least sophisticated method for searching an electronic storage device for the nearest neighbors of a query is to compare, on-line or off-line, each entry in the storage device with the query. Comparing each and every entry with the query, of course, is not practical since the size of an average electronic device is large and continues to increase with the advancements in information storage technology.

Other known methods attempt to reduce the high dimensional representation of entries in electronic storage devices. For example, J. Kleinberg, "Two Algorithms For Nearest-Neighbor Search In High Dimensions," in the proceedings of $29^{th}$ Symposium Of Theory Of Computing, pp. 599–608 (1997), discloses two algorithms for reducing the search space when determining the nearest neighbors in an electronic storage device. The Kleinberg algorithms search for the nearest neighbors by drawing random projections from vectors, which represent the entries in the storage device, to a set of random lines in Euclidean space.

P. Indyk and R. Motwani, "Approximate Nearest Neighbors: Towards Removing The Curse Of Dimensionality," in the proceedings of $30^{th}$ Symposium Of Theory Of Computing (1998), discloses another algorithm for reducing the search space. The Indyk and Motwani algorithm searches for the nearest neighbors in an electronic storage device by partitioning the search space into spheres and by categorizing the entries in the storage device into buckets.

The above methods, however, requirement significant processing and storage resources. Therefore, it is desirable to have a method and system for overcoming the above and other disadvantages of the prior art.

DESCRIPTION OF THE INVENTION

Methods and systems consistent with the present invention determine whether a first string in an electronic storage device resides within a first hamming distance of a second string in the storage device. As used herein, "electronic storage device" refers to any processing system that stores information that a user at an inquiring processor may wish to retrieve. Moreover, the terms "electronic storage device" and "database" will be used interchangeably and should be understood in their broadest sense.

In one embodiment, a database determines one or more nearest neighbors of a query that are within a first hamming distance of the query. The database prebuilds a first set of strings by probabilistically selecting values of respective bits in each of the first set of strings based on a probability that depends on the first hamming distance. Based on the first set of strings, the database predetermines the trace values of data entries in the database, respectively, and stores the predetermined trace values as entries in a trace table.

For each trace value entry, the database identifies the data entries whose trace values are within a second hamming distance of the trace value entry, and stores the addresses of the identified data entries in the trace value entry. When the database receives a query, by identifying the trace value entry in the trace table that matches the trace value of the query, the database determines whether any data entries are within the first hamming distance of the query.

In another embodiment, a first processor communicates with a second processor to determine whether a first string that resides in the first processor is within a first hamming distance of a second string that resides in the second processor. The first processor and the second processor each have access to a shared third string that includes a plurality of bits, where the value of each bit is probabilistically pre-selected based on a probability that depends on a first hamming distance. The first processor computes a first inner product of the first string with the third string, and sends the first inner product to the second processor. When the second processor receives the first inner product, the second processor computes a second inner product of the second string with the third string.

The second processor compares the first inner product with the second inner product to determine whether the first string is within the first hamming distance of the second string as follows: The second processor determines that the distance between the first string and the second string is less than the first hamming distance when the first inner product equals the second inner product. The second processor determines that the distance between the first string and the second string is greater than the first hamming distance when the first inner product is different from the second inner product.

In yet another embodiment, the first processor and the second processor each have access to a shared set of strings that include a plurality of bits, where the value of each bit is probabilistically pre-selected based on a probability that depends on a first hamming distance. The first processor computes a first set of inner products of the first string with each of the set of strings, and sends the first set of inner products to the second processor. When the second processor receives the first set of inner products, the second processor computes a second set of inner products of the second string with the each of the set of strings.

The second processor compares the first set of inner products with the second inner products to determine whether the first string is within the first hamming distance of the second string as follows: The second processor determines that the distance between the first string and the second string is less than a first hamming distance when the distance between the first set of inner products and the second set of inner products is less than a second predetermined hamming distance. The second processor determines that the distance between the first string and the second string is greater than the first hamming distance when the distance between the first set of inner products and the second set of inner products is greater than the second predetermined hamming distance.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1:
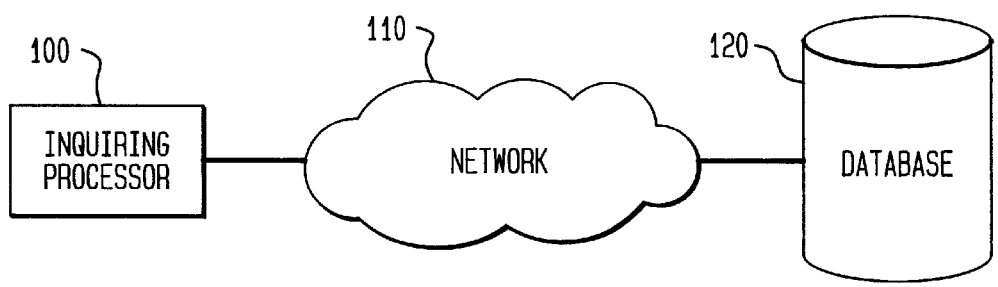
FIG. 1 is a block diagram of an inquiring processor connected to a database, in accordance with an embodiment of the invention.

FIG. 1 is a block diagram of an inquiring processor 100 connected via a network 110 to a database 120, in accordance with an embodiment of the present invention. Inquiring processor 100 may comprise any form of computer capable of generating and transmitting data, for example a query. Inquiring processor 100 can be programed with appropriate application software to implement the methods and systems described herein.

Network 110 comprises any conventional communications network either internal or external for affecting communication between inquiring processor 100 and database 120. Network 110 may comprise, for example, an internal local area network or a large external network, such as the Internet.

Figure 2:
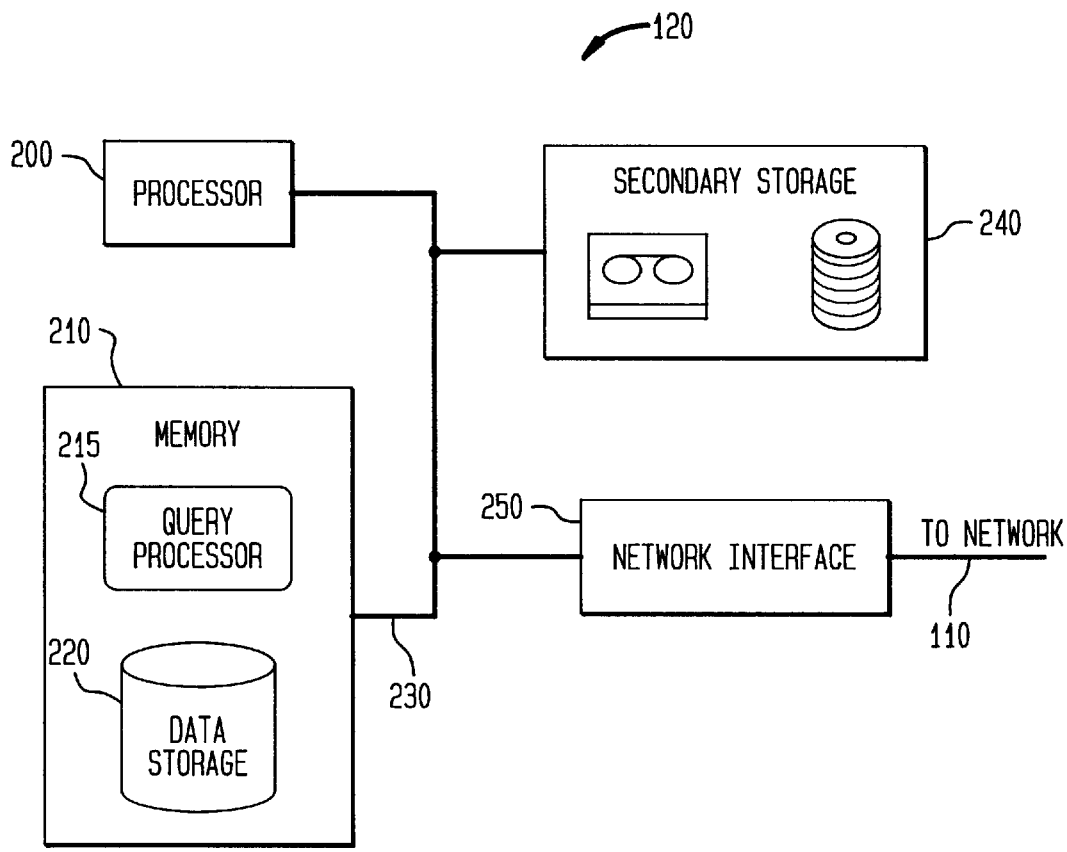
FIG. 2 is a block diagram of a database, in accordance with an embodiment of the invention.

Database 120 includes any conventional data storage or any set of records or data, which are stored, for example, as bits. FIG. 2 is a block diagram of database 120, in accordance with an embodiment of the present invention. Database 120 comprises processor 200 connected via bus 230 to a memory 210, a secondary storage 240, and a network interface card 250, which interfaces network 110. Memory 210 comprises a data storage 220 and a query processor 215, which includes instructions in the form of software that processor 200 executes.

Secondary storage 240 comprises a computer readable medium such as a disk drive and a tape drive. From the tape drive, software and data may be loaded onto the disk drive, which can then be copied into memory 210. Similarly, software and data in memory 210 may be copied onto the disk drive, which can then be loaded onto the tape drive.

Figure 3:
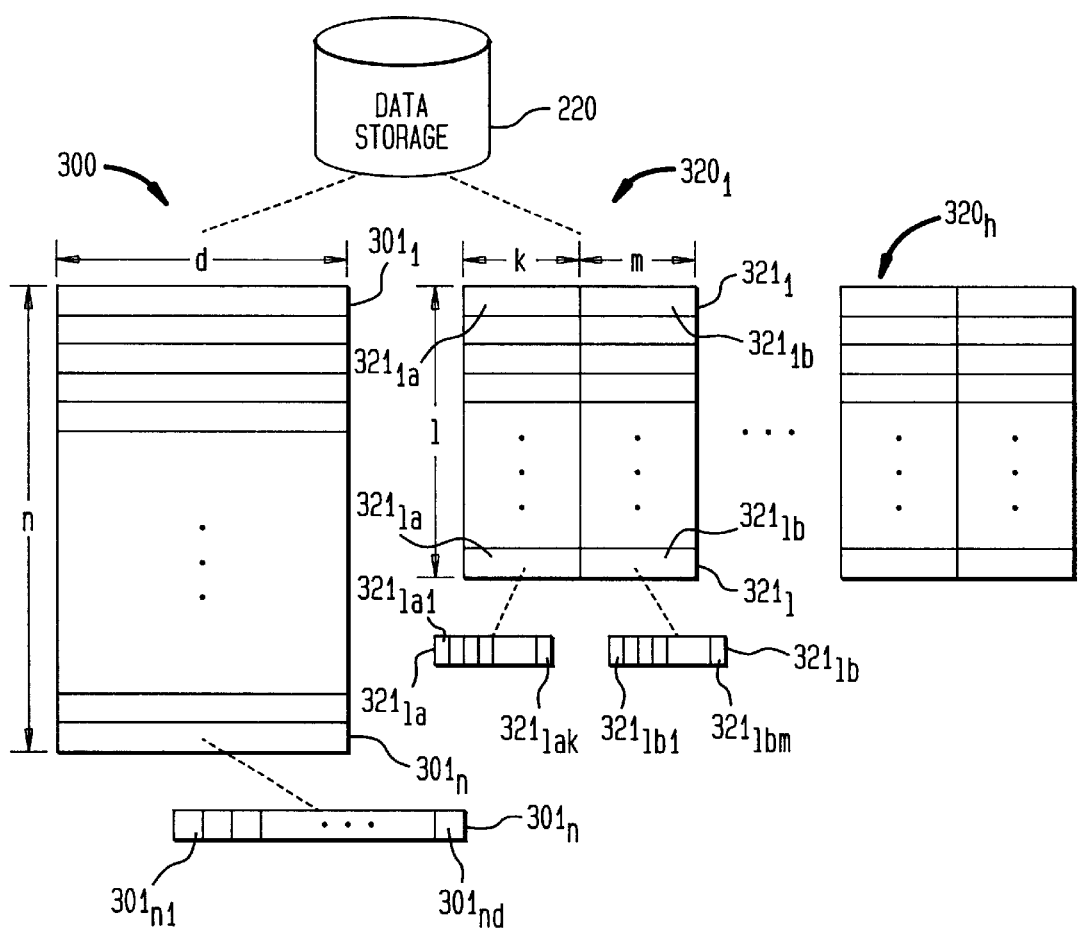
FIG. 3 is a block diagram of a data storage in a database, in accordance with an embodiment of the invention.

FIG. 3 is a block diagram of a data storage 220, in accordance with an embodiment of the invention. As shown, data storage 220 includes a data table 300 and a set of h trace tables $320_1$ through $320_h$, where h is an integer greater than zero. Data table 220 includes n entries $301_1$ through $301_n$, each of which includes a sequence of d bits, where n and d are also integers greater than zero. For example, as shown in FIG. 3, entry $301_n$ in data table 300 includes bits $301_{n1}$ through $301_{nd}$.

Trace tables $320_1$–$320_h$ correspond to a set of predetermined hamming distances, respectively. Each trace table $320_1$–$320_h$ includes l entries $321_1$ through $321_l$, each of which includes a trace value field and a data index field, where l is an integer greater than zero. For example, as shown, entry $321_l$ in trace table $320_1$ includes a trace value field $321_{la}$ and a data index field $321_{lb}$. Trace value field $321_{la}$ includes k bits $321_{la1}$, through $321_{lak}$, where k is an integer greater than zero. Data index field $321_{lb}$ includes m sub-fields $321_{lb1}$ through $321_{lbm}$, each of which includes, for example, the address of an entry in data table 300, where m is an integer greater than zero.

Figure 4:
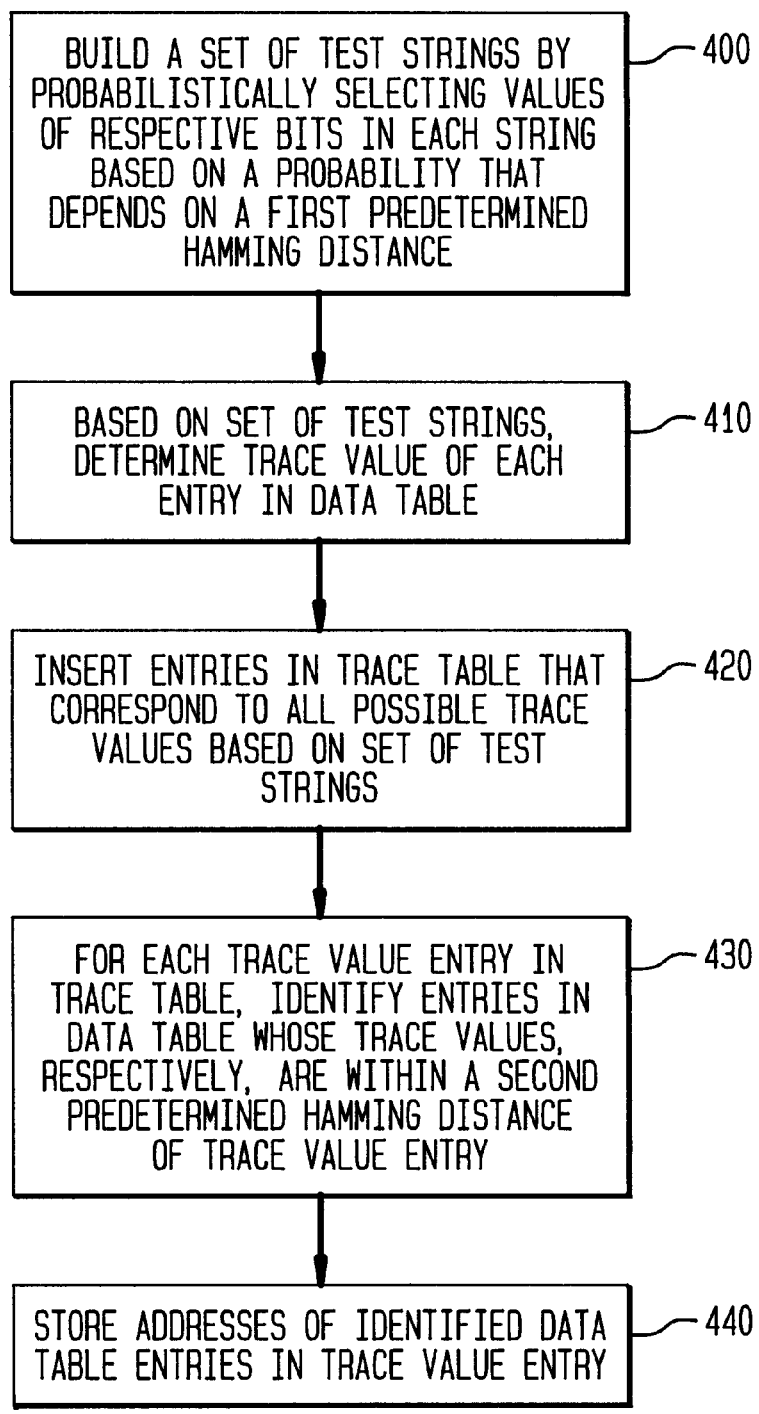
FIG. 4 is a flow chart of the steps performed by a query processor for configuring a trace table, in accordance with an embodiment of the invention.
Figure 5:
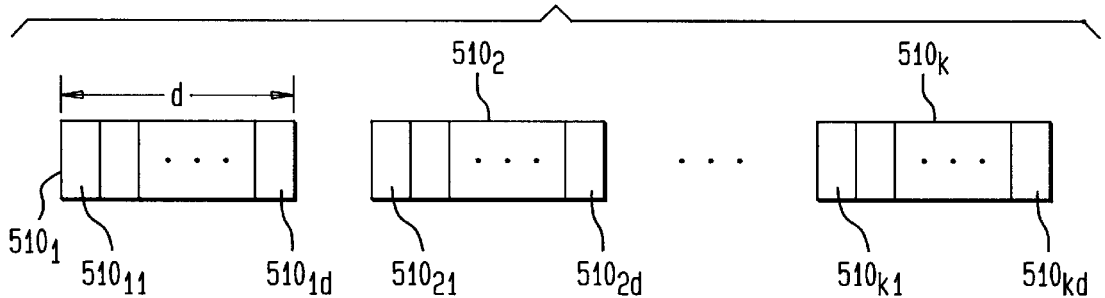
FIG. 5 is a block diagram of a set of test strings for configuring a trace table, in accordance with an embodiment of the invention.

FIG. 4 is a flow chart of the steps performed by query processor 215 for configuring, for example, trace table $320_1$, in accordance with an embodiment of the invention. Query processor 215 builds a set of k test strings $510_1$ through $510_k$ (step 400), which are illustrated in FIG. 5. Each test string $510_1$–$510_k$ includes a sequence of d bits. For example, as shown, test string $510_1$ includes bits $510_{11}$–$510_{1d}$. Query processor 215 probabilistically sets values of the bits in each test string $510_1$–$510_k$ independently at random based on a probability that depends on a first predetermined hamming distance H. Query processor 215 may predetermine the probability of setting a bit to 1 to be, for example, 1/(2H), and the probability of setting a bit to 0 to be 1−1/(2H).

Alternatively, in another embodiment, each entry $301_1$–$301_n$ in data table 300 and test string $510_1$–$510_k$ may include a sequence of d numbers, which are selected from a finite set of numbers that includes 0. Query processor 215 probabilistically selects the numbers in each test string $510_1$–$510_k$ based on a probability that depends on the first predetermined hamming distance H. In this embodiment, query processor 215 may predetermine the probability of selecting the number 0 to be, for example, 1−1/(2H), and the probability of selecting other numbers to be 1/(2H(d−1)).

Based on test strings $510_1$–$510_k$, query processor 215 determines trace values of entries $301_1$–$301_n$, respectively, in data table 300 (step 410). Query processor 215 determines an inner product of each entry $301_1$–$301_n$ with each of test strings $510_1$–$510_k$. For example, for each entry $301_1$–$301_n$, query processor 215 identifies in the entry the bits that correspond to the 1 bits in test string $510_1$. Query processor 215 then performs an exclusive OR operation on the identified bits, the result of which is the first bit of the trace value associated with the entry. Query processor 215 then repeats this step using the remaining test strings $510_2$–$510_k$. Finally, query processor 215 builds a trace value associated with the entry by arranging in a sequence the resulting k bits from the k exclusive OR operations.

Alternatively, in an embodiment where each entry $301_1$–$301_n$ in data table 300 and test string $510_1$–$510_k$ include a sequence of d numbers, query processor 215 determines a vector product of each entry $301_1$–$301_n$ with each test string $510_1$–$510_k$. For example, for each entry $301_1$–$301_n$, query processor 215 multiplies each of the corresponding numbers in the entry with test string $510_1$ and sums the resulting d numbers modulo p, where p is an integer greater than zero. Query processor 215 then repeats this step using the remaining test strings $510_2$–$510_k$. Finally, query processor 215 builds a trace value associated with the entry by arranging in a sequence the resulting numbers based on test strings $510_1$–$510_k$.

Query processor 215 inserts into trace table $320_1$ l entries, which correspond to trace values that are based on test strings $510_1$–$510_k$ (step 420). The number of entries l may be $2^k$ entries or all possible trace values corresponding to test strings $510_1$–$510_k$. Alternatively, the number of entries l may be a subset of all possible trace values.

For each trace value entry $321_1$–$321_l$ in trace table $320_1$, query processor 215 identifies the entries in data table 300 whose trace values (as determined in step 410) are within a second predetermined hamming distance of the trace value entry (step 430). For example, for each entry $301_1$–$301_n$ in data table 300, query processor 215 determines whether the trace value associated with entry $301_1$–$301_n$ is within a second predetermined hamming distance of trace value entry $321_{1a}$ in trace table $320_1$. If the hamming distance between the trace value associated with entry $301_1$–$301_n$ and trace value entry $321_{1a}$ is less than or equal to the second predetermined hamming distance, query processor 215 stores the address of entry $301_1$–$301_n$ in data index field $321_{1b}$ (step 440).

Finally, query processor 215 repeats steps 400–440 as described above for the remaining trace tables $510_2$–$510_n$ based on different sets of test strings that correspond to different predetermined hamming distances, respectively.

Figure 6:
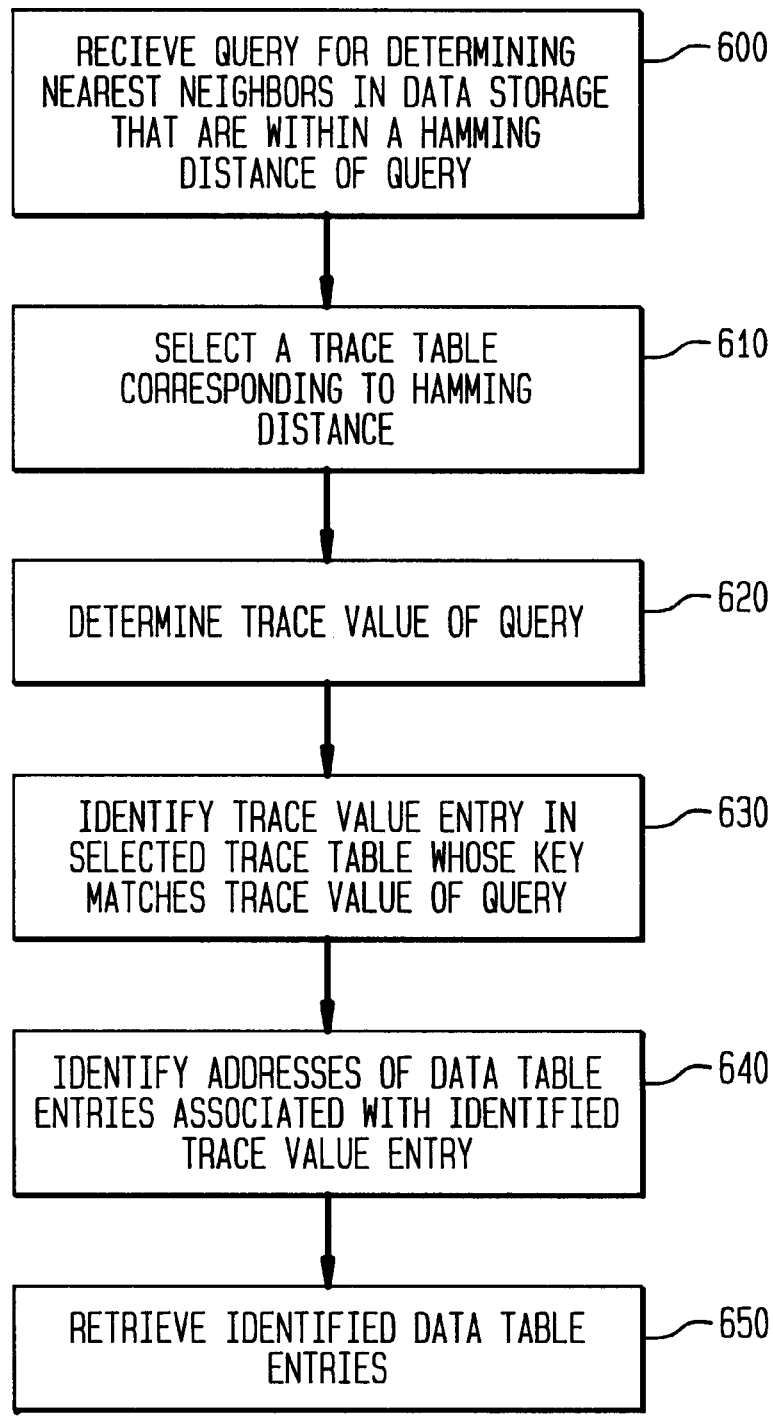
FIG. 6 is a flow chart of the steps performed by a query processor for determining the approximate nearest neighbors of a query, in accordance with an embodiment of the invention.

FIG. 6 is a flow chart of the steps performed by query processor 215 for determining the approximate nearest neighbors of a query transmitted by inquiring processor 100 to database 120, in accordance with an embodiment of the invention. In this embodiment, query processor 215 receives from inquiring processor 100 a query, which includes a sequence of d bits (step 600). Query processor 215 selects a trace table, for example trace table $320_1$, which is configured for a particular hamming distance (step 610).

Query processor 215 then determines the trace value of the query based on the set of test strings $510_1$–$510_k$, which are associated with trace table $320_1$, as follows (step 620): Query processor 215 determines an inner product of the query with each of test strings $510_1$–$510_k$. For example, query processor 215 identifies the bits in the query that correspond to the 1 bits in, for example, test string $510_1$. Query processor 215 then performs an exclusive OR operation on the identified bits. Query processor 215 then repeats this step using the remaining test strings $510_2$–$510_k$. Finally, query processor 215 builds a trace value associated with the query by arranging in a sequence the resulting bits from each exclusive OR operation.

From trace table $320_1$, query processor 215 identifies a trace value entry whose trace value field matches the trace value of the query (step 630). Query processor 215 determines whether the data index field in the identified trace value entry includes addresses of one or more entries in data table 300 (step 640).

If the data index field includes such an address, query processor 215 retrieves from data table 300 the identified entries, and sends the entries to inquiring processor 100. Otherwise, using a binary search, query processor 215 selects from among trace tables $320_2$–$320_h$ a trace table that corresponds to a different hamming distance. Then, query processor 215 repeats steps 600–640 using the new trace table and associated test strings until query processor 215 identifies one or more entries in data table 300.

Figure 7:
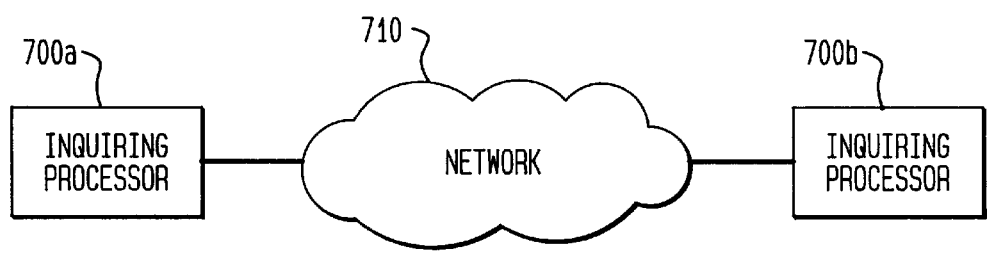
FIG. 7 is a block diagram of a first inquiring processor communicating via a network with a second inquiring processor, in accordance with an embodiment of the invention.

FIG. 7 is a block diagram of an inquiring processor 700a connected via a network 710 to an inquiring processor 700b, in accordance with another embodiment of the invention. Inquiring processors 700a and 700b may each comprise any form of computer capable of generating and transmitting data, for example a query. Inquiring processors 700a and 700b can be programed with appropriate application software to implement the methods and systems described herein.

Network 710 comprises any conventional communications network either internal or external for affecting communication between inquiring processors 700a and 700b. Network 710 may comprise, for example, an internal local area network or a large external network, such as the Internet.

In one embodiment, inquiring processor 700a communicates with inquiring processor 700b to determine whether a first string that resides in inquiring processor 700a is within a first hamming distance H of a second string that resides in inquiring processor 700b. The first string and the second string each include a sequence of d bits. Furthermore, inquiring processors 700*a* and 700*b* each have access to a shared test string that includes a sequence of d bits, where the value of each bit is probabilistically pre-selected at random based on a probability that depends on the first hamming distance H. The probability of selecting a bit to be a 1 bit may, for example, be 1/(2H), and the probability of selecting a bit to be a 0 bit may be 1−1/(2H).

Inquiring processor 700*a* computes a first inner product of the first string with the shared test string, and sends via network 710 the first inner product to inquiring processor 700*b*. When inquiring processor 700*b* receives the first inner product, inquiring processor 700*b* computes a second inner product of the second string with the shared test string.

Inquiring processor 700*b* compares the first inner product with the second inner product to determine whether the first string is within the first hamming distance H of the second string as follows: Inquiring processor 700*b* determines that the distance between the first string and the second string is less than the first hamming distance H when the first inner product equals the second inner product. Inquiring processor 700*b* determines that the distance between the first string and the second string is greater than the first hamming distance H when the first inner product is different from the second inner product.

Finally, inquiring processor 700*b* sends via network 710 the result of the comparison to inquiring processor 700*a*.

In another embodiment, the first string and the second string each include a sequence of d numbers. Furthermore, inquiring processors 700*a* and 700*b* each have access to a shared test string that includes a sequence of d numbers, where each number is probabilistically pre-selected from a set of finite numbers that includes the number 0 based on a probability that depends on a first hamming distance H. The probability of selecting the number 0 may, for example, be 1−1/(2H), and the probability of selecting the other numbers may be 1/(2H(d−1)).

Inquiring processor 700*a* computes a first vector product of the first string with the shared test string, and sends via network 710 the first vector product to inquiring processor 700*b*. When inquiring processor 700*b* receives the first vector product, inquiring processor 700*b* computes a second vector product of the second string with the shared test string.

Inquiring processor 700*b* compares the first vector product with the second vector product to determine whether the first string is within the first hamming distance H of the second string as follows: Inquiring processor 700*b* determines that the distance between the first string and the second string is less than the first hamming distance H when the first vector product equals the second vector product. Inquiring processor 700*b* determines that the distance between the first string and the second string is greater than the first hamming distance H when the first vector product is different from the second vector product.

Finally, inquiring processor 700*b* sends via network 710 the result of the comparison to inquiring processor 700*a*.

In yet another embodiment, to enhance the accuracy when determining whether a first string that resides in inquiring processor 700*a* is within a first hamming distance H of a second string that resides in inquiring processor 700*b*, inquiring processors 700*a* and 700*b* each have access to a shared set of k test strings. Each of the k test strings includes a sequence of d bits, where k<<d and the value of each bit is probabilistically pre-selected at random based on a probability that depends on the first hamming distance H. The probability of selecting a bit to be a 1 bit may, for example, be 1/(2H), and the probability of selecting a bit to be a 0 bit may be 1−1/(2H).

Inquiring processor 700*a* computes a first inner product of the first string with each of the k test strings, and sends via network 710 the first set of inner products to inquiring processor 700*b*. When inquiring processor 700*b* receives the first set of inner products, inquiring processor 700*b* computes a second inner product of the second string with each of the k test strings.

Inquiring processor 700*b* compares the first set of inner products with the second set of inner products to determine whether the first string is within the first hamming distance H of the second string as follows: Inquiring processor 700*b* determines that the distance between the first string and the second string is less than the first hamming distance H when the distance between first set of inner products and the second set of inner products is less than a second predetermined hamming distance. Inquiring processor 700*b* determines that the distance between the first string and the second string is greater than the first hamming distance H when the distance between the first set of inner products and the second set of inner products is greater than the second predetermined hamming distance.

Finally, inquiring processor 700*b* sends via network 710 the result of the comparison to inquiring processor 700*a*.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for determining whether a first string is within a first hamming distance of a second string, said method comprising the steps of:

building a third string that includes a plurality of bits, wherein the value of each bit depends on the first hamming distance;

computing a first inner product of the first string with the third string;

computing a second inner product of the second string with the third string; and comparing the first inner product with the second inner product to determine whether the first string resides within the first hamming distance of the second string.

2. The method of claim 1, wherein the building step comprises the step of:

probabilistically selecting the value of each bit in the third string based on a probability that depends on the first hamming distance.

3. The method of claim 1, wherein the comparing step comprises the steps of:

determining that the distance between the first string and the second string is less than the first hamming distance when the first inner product equals the second inner product; and determining that the distance between the first string and the second string is greater than the first hamming distance when the first inner product is different from the second inner product.

4. A method for identifying one or more entries in a database that are nearest neighbors of a query, wherein the identified entries are within a first hamming distance of the query, said method comprising the steps of:

building a first set of strings by selecting values of respective bits in each of the first set of strings based on the first hamming distance;

determining, based on the first set of strings, trace values of entries in the database, respectively;

determining, based on the first set of strings, a trace value of the query;

identifying the entries in the database whose trace values are within a second hamming distance of the determined trace value of the query.

5. The method of claim 4 further comprising the steps of:

determining a first set of trace values corresponding to the first set of strings; and identifying, for each one of the first set of trace values, the entries in the database whose values are within a second hamming distance of the first set of trace values, respectively.

6. The method of claim 4, wherein the step of determining the trace values of the entries comprises the step of:

computing inner products of each of the first set of strings with each of the entries.

7. The method of claim 4, wherein the step of determining the trace value of the query comprises the step of:

computing inner products of each of the first set of strings with the query.

8. The method of claim 4, wherein the step of determining the trace values of the entries comprises the step of:

computing vector products of each of the first set of strings with each of the entries.

9. The method of claim 4, wherein the step of determining the trace value of the query comprises the step of:

computing vector products of each of the first set of strings with the query.

10. A method for determining whether a first string is within a first hamming distance of a second string, said method comprising the steps of:

building a third string that includes a plurality of numbers, wherein the value of each number depends on the first hamming distance;

computing a first vector product of the first string with the third string;

computing a second vector product of the second string with the third string; and comparing the first vector product with the second vector product to determine whether the first string resides within the first hamming distance of the second string.

11. The method of claim 10, wherein the comparing step comprises the steps of:

determining that the distance between the first string and the second string is less than the first hamming distance when the first vector product equals the second vector product; and determining that the distance between the first string and the second string is greater than the first hamming distance when the first vector product is different from the second vector product.

12. A method for determining whether a first string is within a first hamming distance of a second string, said method comprising the steps of:

building a set of strings that include a plurality of bits, wherein the value of each bit depends on the first hamming distance;

computing a first set of inner products of the first string with the set of strings;

computing a second set of inner products of the second string with the set of strings; and comparing the first set of inner products with the second set of inner products to determine whether the first string resides within the first hamming distance of the second string.

13. The method of claim 12, wherein the comparing step comprises the steps of:

determining that the distance between the first string and the second string is less than the first hamming distance when the distance between the first set of inner products and the second set of inner products is less than a second predetermined hamming distance; and determining that the distance between the first string and the second string is greater than the first hamming distance when the distance between the first set of inner products and the second set of inner products is greater than the second predetermined hamming distance.

14. A method for determining whether a first string is within a first hamming distance of a second string, said method comprising the steps of:

building a set of strings that include a plurality of bits, wherein the value of each bit depends on the first hamming distance;

computing a first set of vector products of the first string with the set of strings;

computing a second set of vector products of the second string with the set of strings; and comparing the first set of vector products with the second set of vector products to determine whether the first string resides within the first hamming distance of the second string.

15. The method of claim 14, wherein the comparing step comprises the steps of:

determining that the distance between the first string and the second string is less than the first hamming distance when the distance between the first set of vector products and the second set of vector products is less than a second predetermined hamming distance; and determining that the distance between the first string and the second string is greater than the first hamming distance when the distance between the first set of vector products and the second set of vector products is greater than the second predetermined hamming distance.

16. A computer-readable medium capable of configuring a database to perform a method for determining whether a first string is within a first hamming distance of a second string, said method comprising the steps of:

building a third string that includes a plurality of bits, wherein the value of each bit depends on the first hamming distance;

computing a first inner product of the first string with the third string;

computing a second inner product of the second string with the third string; and comparing the first inner product with the second inner product to determine whether the first string resides within the first hamming distance of the second string.

17. The computer-readable medium of claim 16, wherein the comparing step comprises the steps of:

determining that the distance between the first string and the second string is less than the first hamming distance when the first inner product equals the second inner product; and determining that the distance between the first string and the second string is greater than the first hamming distance when the first inner product is different from the second inner product.

* * * * *